United States Patent [19]

Sepulveda et al.

[11] 4,417,439

[45] Nov. 29, 1983

[54] STARTING MEANS FOR A GAS TURBINE ENGINE

[75] Inventors: Domingo Sepulveda, Vernon; Edmund E. Striebel, South Windsor, both of Conn.

[73] Assignee: United Technologies Corporation, Hartford, Conn.

[21] Appl. No.: 287,852

[22] Filed: Jul. 29, 1981

[51] Int. Cl.³ .............................................. F02C 7/264
[52] U.S. Cl. .................................. 60/39.141; 60/742; 60/746
[58] Field of Search ................... 60/742, 39.14 R, 746, 60/747, 39.82 P, 739, 740

[56] References Cited

U.S. PATENT DOCUMENTS

| 2,540,642 | 2/1951 | Allen et al. | 60/39.82 P |
| 2,969,925 | 1/1961 | Burgess et al. | 60/746 X |
| 3,763,650 | 10/1973 | Hussey et al. | 60/742 X |
| 4,062,183 | 12/1977 | Davies et al. | 60/39.14 R X |

Primary Examiner—Louis J. Casaregola
Assistant Examiner—Donald E. Stout
Attorney, Agent, or Firm—Norman Friedland

[57] ABSTRACT

Improvement to the starting characteristics of an annular combustor for a gas turbine engine that employs dual fuel nozzles (primary and secondary fuel flow systems) by redistributing the total fuel admitted to the nozzles in an asymmetrical pattern to deliver the requisite amount of fuel to the igniter by the primary flow system feeding fuel to that igniter.

3 Claims, 2 Drawing Figures

STARTING MEANS FOR A GAS TURBINE ENGINE

TECHNICAL FIELD

This invention relates to the fuel system of a gas turbine engine and particularly to means for improving starting of the engine.

BACKGROUND ART

This invention serves to solve an engine start problem in an annular type of combustor that includes a plurality of equally spaced dual fuel nozzles feeding fuel into the combustor. In the context of this patent application the term dual nozzle is a single fuel nozzle that houses both a primary and secondary flow system and each system is referred to as the primary nozzle and secondary nozzle, respectively. In this type of burner construction, as for example, that exemplified by the JT9D engine model manufactured by Pratt & Whitney Aircraft Group of United Technologies Corporation, the assignee of this patent application, each fuel nozzle is identical and each fuel nozzle delivers substantially the same amount of fuel to the combustor. Typically, in such a dual nozzle the primary nozzle is operable over the entire engine operating envelope and delivers, say 75% of fuel during idle and 10% during takeoff. The secondary nozzle, typically is utilized solely during higher thrust operations and delivers 30% of the total fuel during idle and 90% during takeoff. The total fuel flow is metered by a fuel control and distributed by a diverter valve to the fuel manifolds communicating with these nozzles.

In a conventional gas turbine engine, as the JT9D engine model, supra, starting fuel flow (600-800 pounds per hour total) is provided to all fuel nozzles, and as noted above, the distribution is even through all the nozzles. The fuel is typically atomized by pressure or aerated and mixes with air to form a combustible mixture. Combustion is initiated by exposing this mixture to a high energy igniter which remains activated for a given period of time, until at least after, combustion ensues.

Because of mechanical limitation within the combustor and engine, such as starting during other than optimum starting temperatures (as for example cold days) or where the nozzle and igniter design configuration may not be at optimum, the operator may induce increased amounts of fuel flow to achieve starting. Under such circumstances, the starting times tend to become longer and fuel tends to accumulate or form puddles in the combustion chamber, consequently causing undesirable hot starts with a tendency of increasing the incidence of compressor stall.

We have found we can improve the incidence of starting and starting times by making an otherwise symmetrical nozzle/fuel injection system in an annular combustor into an asymmetrical system. It is contemplated by this invention that simple flow restrictors are incorporated in all of the non-igniter located primary nozzles and the igniter located primary nozzles remain in tact (unrestrictive). Hence, in an already existing system, the starting characteristics are improved by merely adding flow restrictors at judicious locations say in a twin igniter sytem, 18 of 20 nozzles are restricted. This allows the use of existing hardware and does not necessitate the change of the fuel flow requirements and its fuel metering and distribution systems.

Other means for achieving optimum starting are contemplated within the scope of this invention, as for example, plugging a limited number of primary nozzles, changing the flow characteristics of the igniter located nozzles, and the like. The important aspect of this invention is that the amount of fuel distributed to the igniter to obtain optimum starting characteristics is preascertained and the fuel from the distribution system distributing an already established fuel flow is redistributed to an asymmetrical distrubution pattern to achieve the requisite predetermined amount of the fuel to the igniter nozzle.

This serves to limit the quantity of fuel in the restrictive nozzles while increasing the quantity in the unrestrictive nozzles. The amount of fuel selected in the unrestrictive nozzles is preascertained to achieve optimum starting. Hence the size of restrictor is predetermined to achieve the quantity of flow necessary in the unrestrictive nozzle.

DISCLOSURE OF INVENTION

An object of this invention is to provide for a gas turbine engine of the type employing an annular combustor improved starting means. A feature of this invention is to establish the quantity of fuel necessary to supply the igniter for optimum starting and redistribute the fuel delivered to the fuel nozzles in an asymmetrical pattern to achieve the preselected amount. Another feature is to modify the fuel flow pattern in the primary fuel nozzles of a dual fuel nozzle system so that each nozzle not associated with an igniter includes an upstream disposed restrictor. Such a system is characterized as being simple to modify existing hardware, relatively inexpensive and allows all the fuel nozzles to be identical.

Other features and advantages will be apparent from the specification and claims and from the accompanying drawings which illustrate an embodiment of the invention.

BEST MODE FOR CARRYING OUT THE INVENTION

While this invention in its preferred embodiment is utilized with an annular combustor for a gas turbine engine where twenty dual fuel nozzles are symmetrically spaced in the dome of the combustor the location and the number of the fuel nozzles do not constitute a limitation of the scope thereof. Suffice it to say that the invention solves the starting problems in an annular combustor having homogeneous fuel flow in a dual fuel nozzle system. The method of achieving improved starting characteristics in such a system is to preascertain the quantity of fuel that should be delivered to the igniter for the conditions desired for optimum starting. Once this value is established and knowing the total quantity being metered by the fuel system to each nozzle, the symmetrical distribution pattern can be changed to an asymmetrically pattern to flow the necessary fuel in the primary fuel nozzle associated with the igniter. In the context of this patent application the nozzle that is positioned to deliver the necessary fuel to the igniter is referred to as the igniter fuel nozzle and the others are referred to as the non-igniter fuel nozzle.

Figure 1:
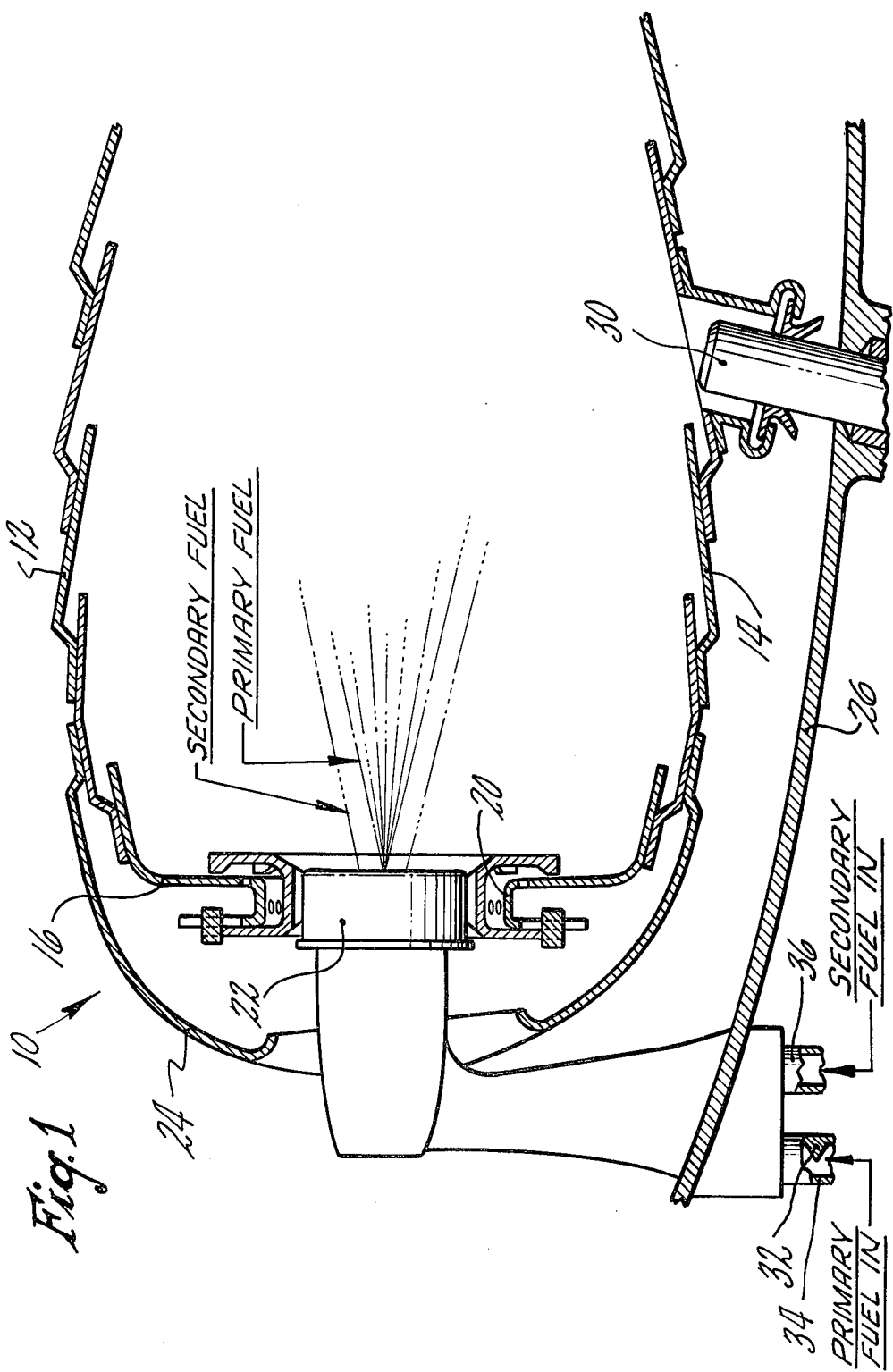
FIG. 1 is a partial view partly in elevation and partly in section schematically illustrating a typical annular combustor having a dual fuel nozzle with a primary and secondary fuel system.
Figure 2:
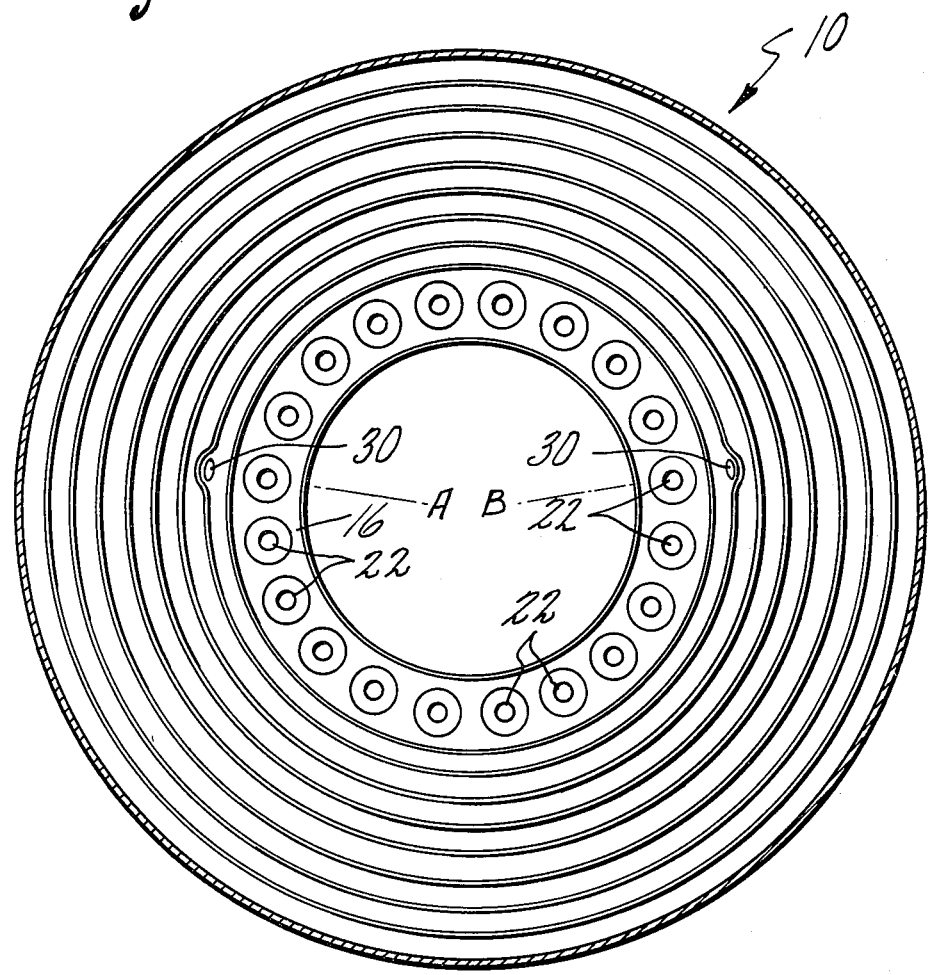
FIG. 2 is a schematic view showing the relationship of the fuel nozzles relative to the igniter in a typical combustion system.

As noted in FIGS. 1 and 2, the annular combustor generally illustrated by reference numeral 10 is defined by a conventional louvered constructed outer annular member 14 and the radially spaced and concentrically mounted inner annular louvered constructed member 12. The forward end relative to the flow of combustion products is closed by a dome 16 which carries a plurality of circumferentially spaced openings 20 (twenty in number) for receiving the twenty fuel nozzles 22 (one being shown in FIG. 1) suitably supported by the diffuser case 26. The front end is customarily encapsulated by a hood 24 attached to the inner and outer annulii. The details of the combustor and associated nozzles are eliminated herefrom for the sake of convenience and simplicity, but such details can be obtained by referring to the JT9D engine model, supra.

Suffice it to say that each fuel nozzle 22 is of the dual fuel system continuously delivering fuel through the primary nozzle during the entire engine operating cycle and through the secondary nozzle solely upon the higher thrust regimes. Typically and as shown herein such combustors carry two igniters 30 which also are commercially available and in this instance bears a ratio relation of the height of the dome to the axial distance from the nozzle and generally falls within the range of 0.5 to 1.0.

In accordance with this invention a suitable restrictor 32 is mounted in eighteen of the primary fuel lines 34 (one being shown) upstream of the primary nozzle exit. The secondary fuel lines 36 (one being shown) remains unchanged. Hence, in this preferred embodiment and as noted in FIG. 2, both of the fuel nozzles at stations A and B remain unchanged and all of the primary nozzles of the remaining eighteen fuel nozzles at the other stations not aligned with the igniters are modified to include the upstream restrictors 32.

In an actual demonstration where an existing homogeneous fuel nozzle system that flowed thirty pounds of fuel per hour (PPH) per nozzle was employed, and which was modified to include eighteen restrictive passages, the optimum ignition was established where the igniter fuel nozzle delivered fuel at 52 PPH. By merely restricting flow to the eighteen non-igniter primary nozzles to reduce the flow to approximately 28 PPH increased fuel in the igniter fuel nozzles without changing anything else in the system.

Obviously, since the primary fuel flow accounts for only 10% of the total flow during high power performance, this modification had virtually no impact on performance and pressure drop. At idle power where the primary fuel flow accounts for a large percentage of the total flow, say 50-75%, the restrictive passageway configuration had a significant impact on the engine operation and such impact was favorable. Such a system has shown to reduce starting times and minimizes hot starts and compressor stall.

It should be understood that the invention is not limited to the particular embodiments shown and described herein, but that various changes and modifications may be made without departing from the spirit and scope of this novel concept as defined by the following claims.

We claim:

1. For a gas turbine engine having an annular combustor and a fuel system including a plurality of circumferentially spaced dual fuel nozzles for leading fuel into the combustor, each nozzle having a primary fuel system for continuously flowing fuel to the combustor during the entire engine operating envelope and a secondary fuel system for flowing fuel solely during the higher thrust regimes of the engine operating envelope, at least one igniter in said annular combustor and one of said dual fuel nozzles associated with said igniter to feed a predetermined amount of fuel thereto for starting of said engine, means for asymmetrically distributing a predetermined amount of fuel to each of said fuel nozzles for delivering fuel to the primary fuel system of said dual fuel nozzle associated with said igniter at an amount different than all the other primary fuel systems of all of said other dual fuel nozzles.

2. For a gas turbine engine as in claim 1 including a fixed restrictor in each of said primary fuel systems not associated with said igniter disposed upstream of said igniter.

3. For a gas turbine engine as claim 2 wherein said combustor includes a pair of igniters disposed at predetermined locations relative to the dual fuel nozzles and a pair of dual fuel nozzles leading fuel directly to each of said igniters.

* * * * *